US011557927B2

(12) United States Patent
Glover

(10) Patent No.: US 11,557,927 B2
(45) Date of Patent: *Jan. 17, 2023

(54) SYSTEMS, DEVICES, AND/OR METHODS FOR MANAGING ELECTRICAL ENERGY

(71) Applicant: Ahmad L. D. Glover, Smithfield, VA (US)

(72) Inventor: Ahmad L. D. Glover, Smithfield, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/019,312

(22) Filed: Sep. 13, 2020

(65) Prior Publication Data
US 2021/0249912 A1    Aug. 12, 2021

Related U.S. Application Data

(63) Continuation-in-part of application No. 16/482,347, filed on Jul. 31, 2019, now Pat. No. 10,992,158, and a continuation-in-part of application No. 15/640,574, filed on Jul. 2, 2017, now Pat. No. 9,985,465.

(60) Provisional application No. 62/506,737, filed on May 16, 2017.

(51) Int. Cl.
*H02J 50/80* (2016.01)
*H02J 50/20* (2016.01)
*H02J 50/30* (2016.01)
*H02J 50/90* (2016.01)
*H02J 7/00* (2006.01)
*H02J 7/02* (2016.01)
*H02J 50/40* (2016.01)

(52) U.S. Cl.
CPC .......... *H02J 50/80* (2016.02); *H02J 7/00032* (2020.01); *H02J 7/0047* (2013.01); *H02J 7/02* (2013.01); *H02J 50/20* (2016.02); *H02J 50/30* (2016.02); *H02J 50/40* (2016.02); *H02J 50/90* (2016.02)

(58) Field of Classification Search
CPC .. H02J 7/025; H02J 50/20; H02J 50/80; H02J 50/30; H02J 50/40; H02J 50/90; H02J 7/00032; H02J 7/0047; H02J 7/02; H04W 64/00; H04W 84/18
USPC ...................... 455/456.1, 571–574
See application file for complete search history.

(56) References Cited

U.S. PATENT DOCUMENTS

2004/0142733 A1* 7/2004 Parise .................. B01F 5/0614
455/572

* cited by examiner

*Primary Examiner* — Joel Ajayi
(74) *Attorney, Agent, or Firm* — Cooper & Assoc; Mark L. Cooper

(57) ABSTRACT

Certain exemplary embodiments can cause an electronic device to charge or be remotely powered via a device. The device comprises a wireless transceiver. The device is constructed to: identify an electronic device in proximity to the device; automatically add, hand off or remove the electronic device to/across/from the network; and automatically determine a charge or remote power level of the electronic device.

2 Claims, 25 Drawing Sheets
(20 of 25 Drawing Sheet(s) Filed in Color)

15000

19000

SYSTEMS, DEVICES, AND/OR METHODS FOR MANAGING ELECTRICAL ENERGY

CROSS-REFERENCES TO RELATED APPLICATIONS

This application is a continuation in part of U.S. Pat. No. 9,985,465, which issued on May 29, 2018 and was filed Jul. 2, 2017. This application is a continuation in part of pending U.S. patent application Ser. No. 17/019,312, which was filed on Sep. 13, 2020. This application is a continuation in part of U.S. patent application Ser. No. 16/482,347, which was a national stage filling of International Patent Application PCT/US18/15625, which International Patent Application was filed on Jan. 28, 2018. This application claims priority in part to U.S. Provisional Patent Application Ser. No. 62/506,737, which was filed May 16, 2017.

BRIEF DESCRIPTION OF THE DRAWINGS

The patent or application file contains at least one drawing executed in color. Copies of this patent or patent application publication with color drawings will be provided by the Office upon request and payment of the necessary fee. A wide variety of potential practical and useful embodiments will be more readily understood through the following detailed description of certain exemplary embodiments, with reference to the accompanying exemplary drawings in which.

DETAILED DESCRIPTION

Certain exemplary embodiments can cause an electronic device or device's receiver to charge or be powered via a device. The device comprises a wireless transceiver. The device is constructed to: identify electronic device receivers in proximity to the transmitting device; automatically add the electronic receiver device to one or more transmitters of a Wireless electrical Grid Local Area Network (WiGL); and automatically determine a charge or power level of the electronic device and/or the electronic device's wireless power receiver.

Certain exemplary embodiments can provide a system, which comprises a multi point power and charger. The multi point power and charger are coupleable to an electrical energy source. The multi point power and charger is constructed to emit a plurality of directional wireless beams. Each of the plurality of directional beams is directable toward a determined direction of an electronic device's receiver that is chargeable via the multi point power and charger.

Certain exemplary embodiments provide an adaptable multi point power and charger, which utilizes a smart antenna and is coupleable to an ad hoc network. The multi point power and charger adaptively directs power to charge remote devices. The multi point power and charger is relatively efficient and reduces electromagnetic waves such as ambient radio frequency ("RF") power to provide low interference.

Figure 1:
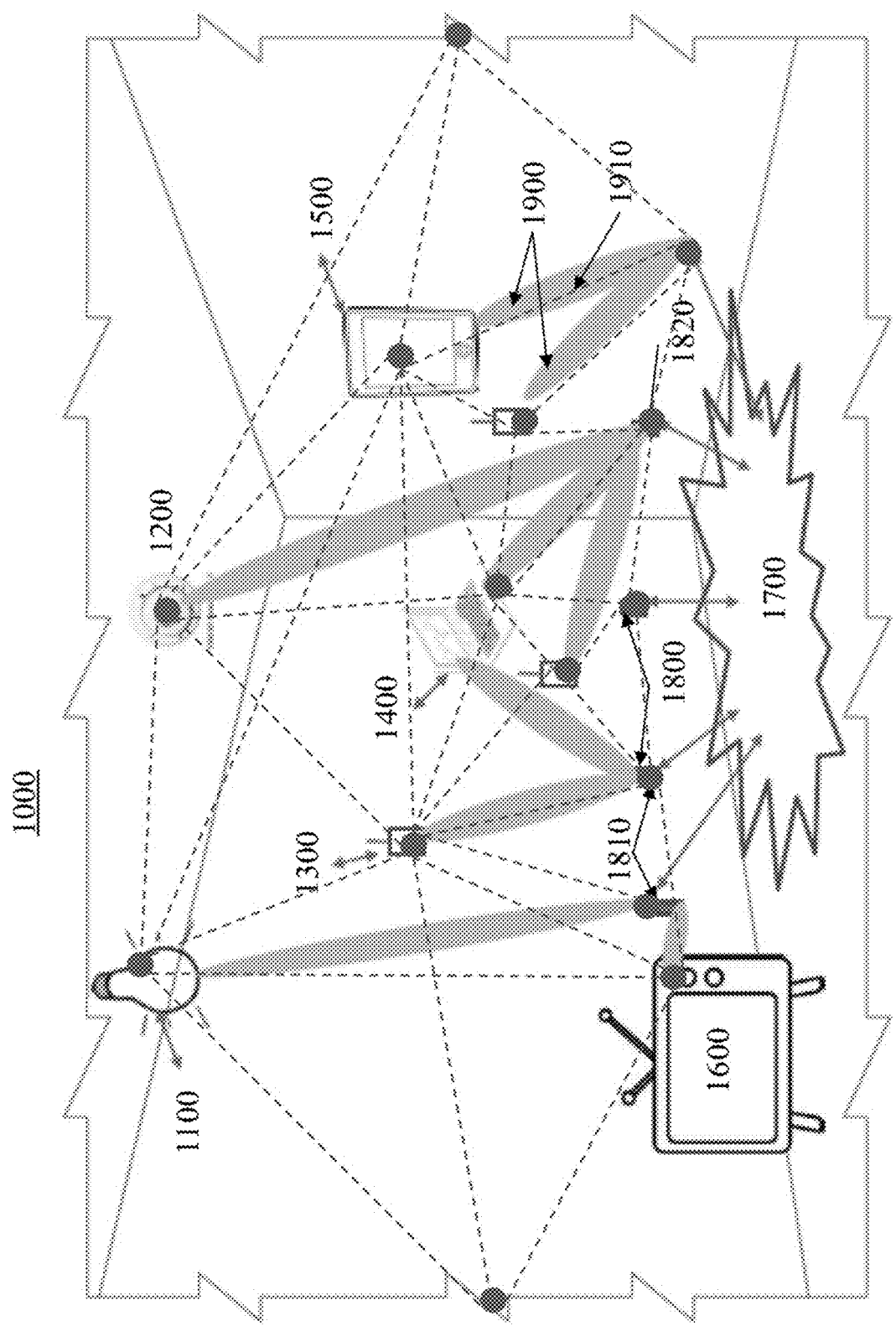
FIG. 1 is a block diagram of an exemplary embodiment of a system 1000.

FIG. 1 is a block diagram of an exemplary embodiment of a system 1000. A plurality of multi point power and chargers 1800 can be electrically coupled to electrical energy sources 1810 (e.g., electrical outlets as illustrated, or solar cells, direct current batteries or kinetic materials). Plurality of multi point power and chargers 1800 can be electrically and/or communicatively coupled to devices (e.g., to a handheld device 1500, home security system 1200, relatively high power un-tethered devices 1400, electronic device 1300 (which can be one of a plurality of relatively low power un-tethered devices), a light fixture 1100, and/or a TV/home gateway 1600, etc. as illustrated).

Multi point power and chargers 1800 can mount and/or be coupled to electrical energy sources 1810 and generate directional beams 1900 (which directional beams provide power to system devices) directed to one or more devices that are chargeable. Multi point power and chargers 1800 can be communicatively coupled to a local area network ("LAN") 1700 to communicate information concerning one or more of:

identify one or more devices in need of charging;
location information concerning one or more devices; and/or
a selection of a charge controller to charge one or more identified devices.

One or more identified devices can request charging from multi point power and chargers 1800. A directional beam of directional beams 1900 can be assigned to the device requesting a charge to begin charging. Certain exemplary embodiments update device locations as devices move. Thereby, selected multi point power and chargers 1800 providing recharging can be changed based upon movement of a given rechargeable device. Power transmitted via RF can be dynamically adjusted based upon device location and charging need.

Multi point power and chargers 1800 generate directed beams of power to target a device that needs and/or requests charging. Multi point power and chargers 1800 can be communicatively coupled to LAN 1700 to communicate information such as:
- each device and/or receiver that requests charging or power is assigned an identifier and becomes a node of the WiGL network;
- each device and/or receiver that requests charging or power can elect to request to be charged, powered or not;
- what devices and/or receiver need to be charged or powered;
- where each device and/or receiver is located and/or
- which of multi point power and chargers 1800 charge which device and/or receiver; etc.

Mobile devices are communicatively coupled to LAN 1700. If a mobile device needs and/or requests charging or power, the mobile device sends a request via LAN 1700. A directional beam is assigned to the mobile device and charging and/or powering starts. Locations of devices are repeatedly updated.

A system 1000 comprises a multi point power and charger 1820, which is one of plurality of multi point power and chargers 1800. Multi point power and charger 1820 is coupleable to an electrical energy source 1810. Multi point power and charger 1820 is constructed to emit a plurality of directional beams 1900. Wherein each of plurality of directional beams 1900 is directable toward a determined direction of an electronic device 1300. Multi point power and charger 1820 is constructed to wirelessly charge or power electronic device 1300. Multi point power and charger 1820 can comprise:
- a converter (see e.g., converter 3200 of FIG. 3) that is constructed to convert electrical energy having an alternating current or direct current, such as from solar energy sources, or kinetic energy producing materials into wireless electrical energy;
- a base band processor (see e.g., base band processor 3300 of FIG. 3);
- a RF processor (see e.g., RF processor 3400 of FIG. 3);
- a multidirectional antenna array (see e.g., multidirectional antenna array 3600 of FIG. 3), the multidirectional antenna array constructed to emit substantially wireless directional beams 1900 that are at least one of:
  - directed in any of a plurality of directions; and
  - transmitted substantially wirelessly via a locally available electromagnetic energy such as RF or laser signal, RF or laser signal comprising a electromagnetic charging beam 1910; and
- a system controller constructed to:
  - enable electronic device 1300 to be followed by the electromagnetic charging beam 1910 (which can be one of plurality of directional beams 1900) responsive to motion of electronic device 1300; and
  - allow for a formation of an AdHoc Meshed Network calculates a position of electronic device 1300 so as to redirect the electromagnetic charging beam (i.e., one of plurality of directional beams 1900).

Multi point power and charger 1820 is constructed to:
- determine a location of electronic device 1300;
- direct one of plurality of directional beams 1900 toward the determined location of electronic device 1300 to charge or power electronic device 1300;
- provide plurality of directional beams 1900 via electromagnetic frequencies into a general location, whereby electronic device 1300 is charged when in a range within which multi point power and charger 1820 can cause a self-charge or recharge;
- provide a plurality of wireless electrical power electromagnetic transmissions (i.e., plurality of directional beams 1900) into a general location, wherein electronic device 1300 is charged when in a range within which multi point power and charger 1820 can cause a self-charge or recharge;
- provide electrical energy wirelessly to any detected device (e.g., electronic device 1300) that requests electrical energy;
- automatically update the location of electronic device 1300; and/or
- redirect one of plurality of directional beams 1900 toward the updated location of electronic device 1300, etc.

A signal can be received by the multi point power and charger 1820 indicating:
- that a charging request from electronic device 1300; and
- which of plurality of directional beams 1900 will be providing electrical energy to electronic device 1300.

Multi point power and charger 1820 can be one of plurality of the multi point power and chargers 1800. A signal can be received by multi point power and charger 1820 indicating:
- a charging request from electronic device 1300; and
- which of plurality of multi point power and chargers 1820 will be providing electrical energy to electronic device 1300.

Multi point power and charger 1820 can be dynamically selected from plurality of multi point chargers 1800 based upon a determined location of electronic device 1300.

Machine instructions (e.g., machine instructions 3900 of FIG. 3) that cause the electronic device 1300 to be charged via multi point power and charger 1820.

Figure 2:
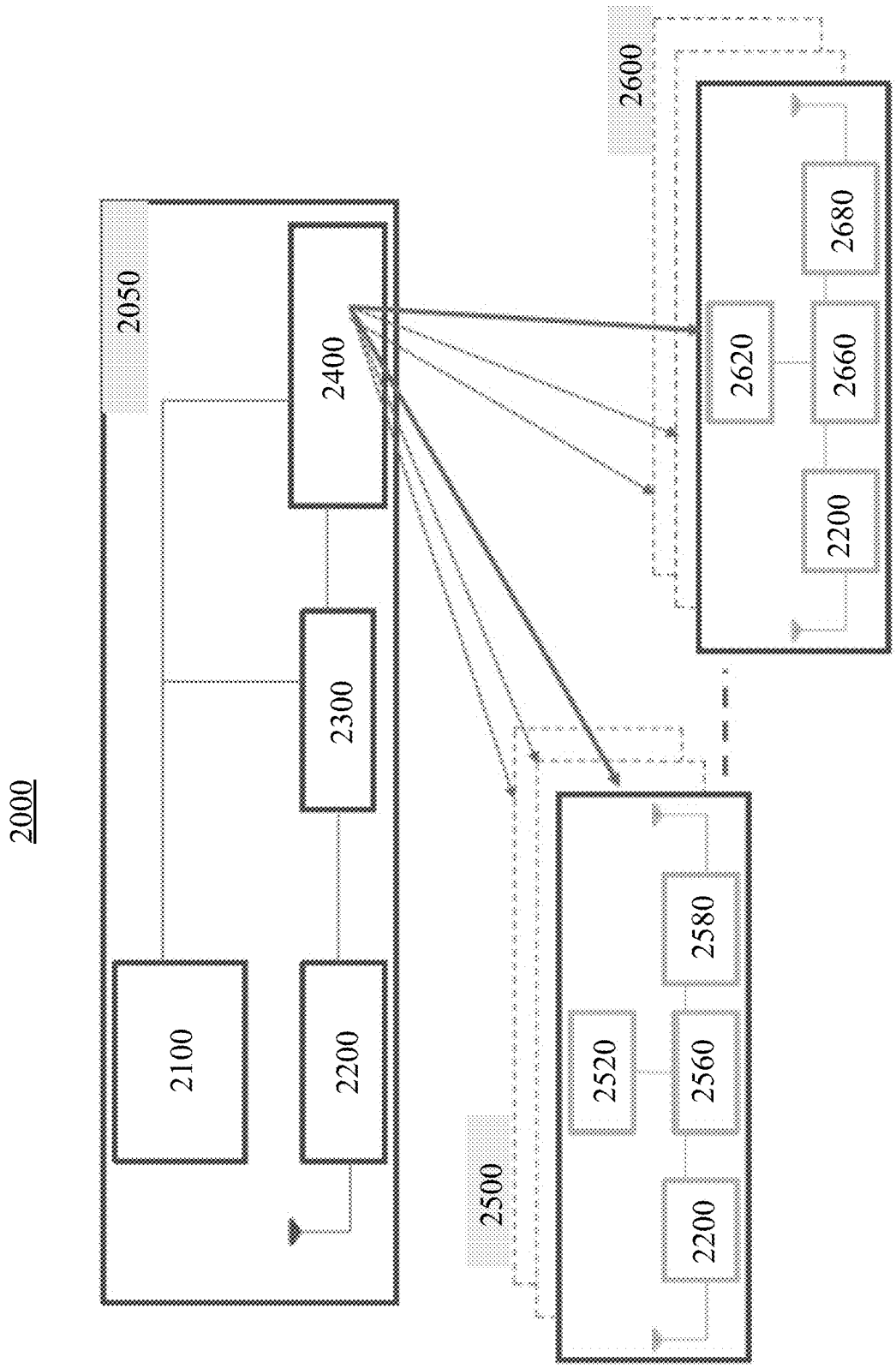
FIG. 2 is a block diagram of an exemplary embodiment of a system 2000.

FIG. 2 is a block diagram of an exemplary embodiment of a system 2000, which comprises a wall mounted multi point power and charger 2050, mobile units 2500, and mobile units 2600. Multi point power and charger 2050 comprises a wall alternating current ("AC") to direct current ("DC") converter 2100 and a controller 2300. Wall mounted unit is communicatively coupled to a LAN 2200 and is constructed to transmit multi-directional beams 2400. Mobile units 2500 comprise a battery charger 2520, a controller 2560, and a receiver 2580. Mobile units are communicatively coupled to LAN 2200. Mobile units 2600 comprise a battery charger 2620, a controller 2660, and a receiver 2680. Mobile units are communicatively coupled to LAN 2200.

A wall mount multi point power and charger is augmented by a controller. The system provides electromagnetic beam forming capabilities, which RF or laser beams are formed and directed via communications transmitted via a formed AdHoc network. When an untethered device (e.g., an electronic device) needs charging, it requests charging via a signal transmitted via the AdHoc Meshed Network. A particular multi point power and charger is selected by an information device coupled to the AdHoc Meshed Network, which causes generation of a directed beam that is a electromagnetic radio frequency ("RF") or laser beam. The information device determines the location of the untethered device and assigns a different beam if necessary. RF or laser transmitted power is dynamically adjusted based the location and charging needs of the untethered device.

Figure 3:
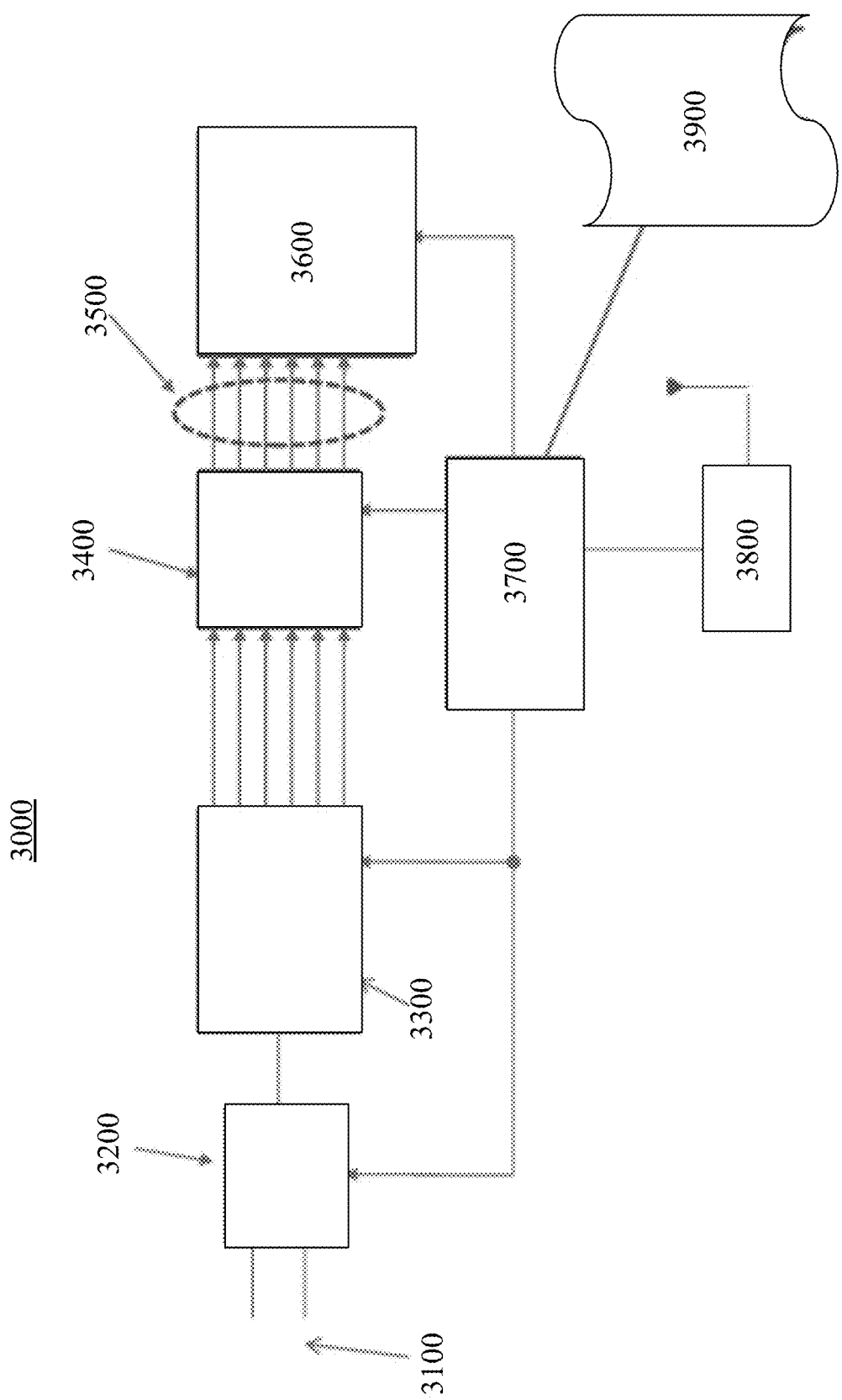
FIG. 3 is a block diagram of an exemplary embodiment of a system 3000.

FIG. 3 is a block diagram of an exemplary embodiment of a system 3000. AC power 3100 enters system 3000 and is converted to DC power via converter 3200. System 3000 comprises a base band processor 3300, an RF processor 3400, a beam formation control 3500, a multidirectional antenna array 3600, a system controller 3700, a LAN 3800, and machine instructions 3900.

Figure 4:
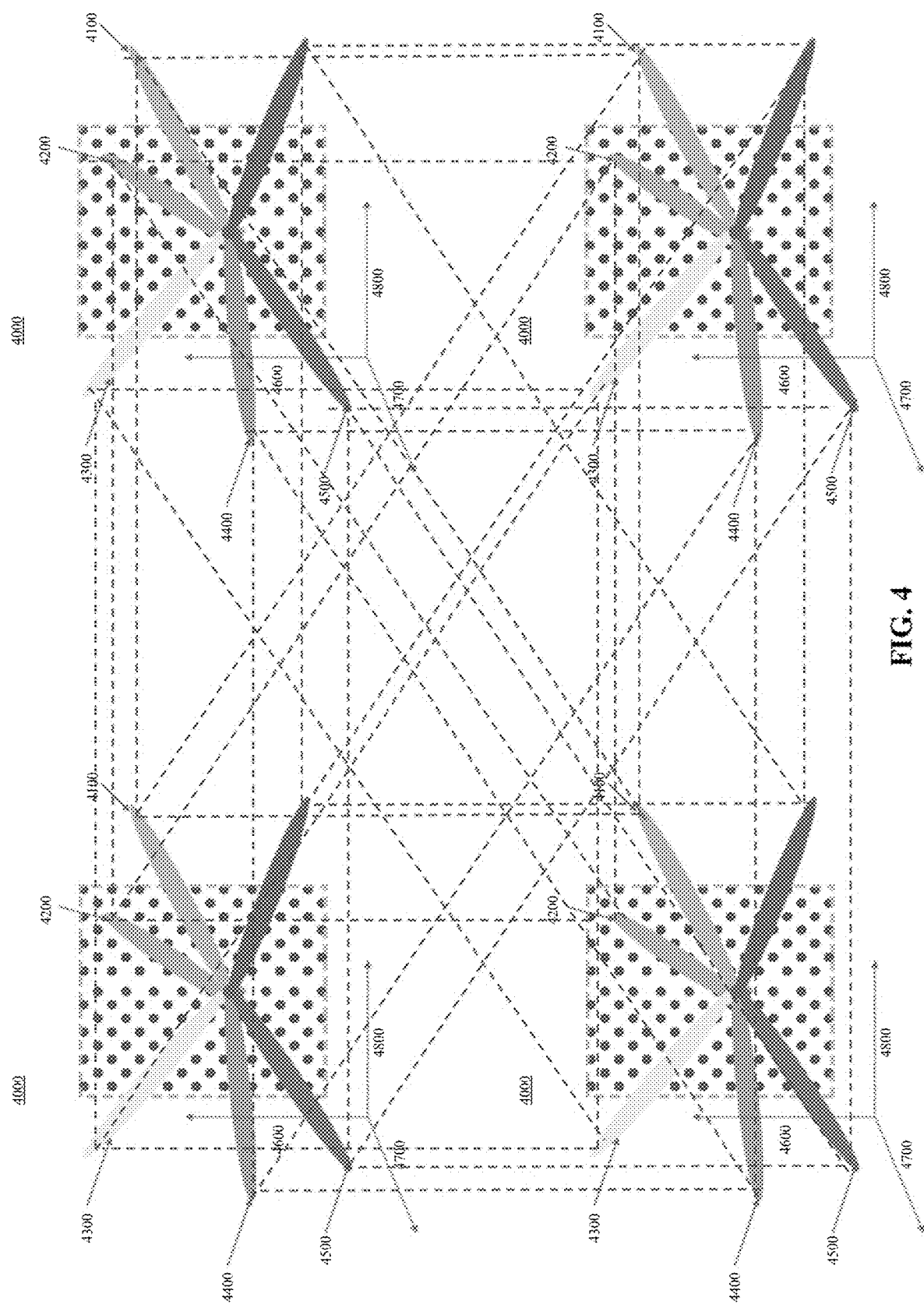
FIG. 4 is a block diagram of an exemplary embodiment of a multi directional antenna array 4000.

FIG. 4 is a block diagram of an exemplary embodiment of a multi directional antenna array 4000. RF or laser energy is directed to a mobile device on a transmit side. The system detects a presence of the mobile device and assigns a charging RF beam for it. Multi directional antenna array 4000 transmits a first charging beam 4100, a second charging beam 4200, a third charging beam 4300, a fourth charging beam 4400, and a fifth charging beam 4500. Each charging beam can be directed in three-dimensional space relative to an x-axis 4800, a y-axis 4600, and a z-axis 4700.

Figure 5:
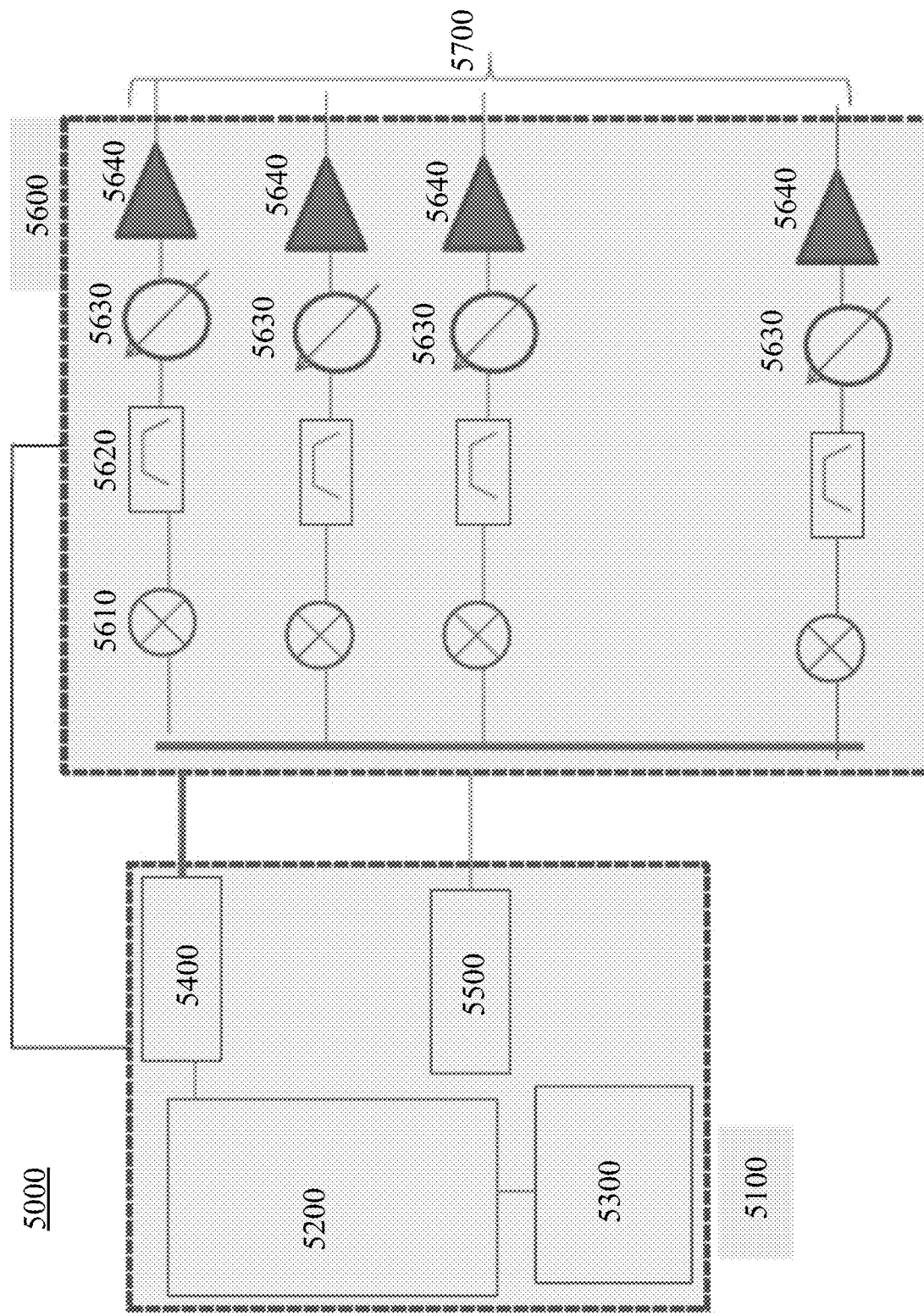
FIG. 5 is a block diagram of an exemplary embodiment of a wall mounted multi point power and charger system 5000.

FIG. 5 is a block diagram of an exemplary embodiment of a wall mount multi point power and charger system 5000, which comprises a baseband processor 5100 and an RF processor 5600. Baseband processor 5100 comprises a processor 5200, a controller 5300, modulators 5400, and beam control 5500. RF processor 5600 comprises a plurality of local oscillators 5610, a plurality of band pass filters 5620, a plurality of phase shifters 5630, and a plurality of power amplifiers 5640. An output 5700 from multi point power and charger system 5000 flows to antenna elements.

Figure 6:
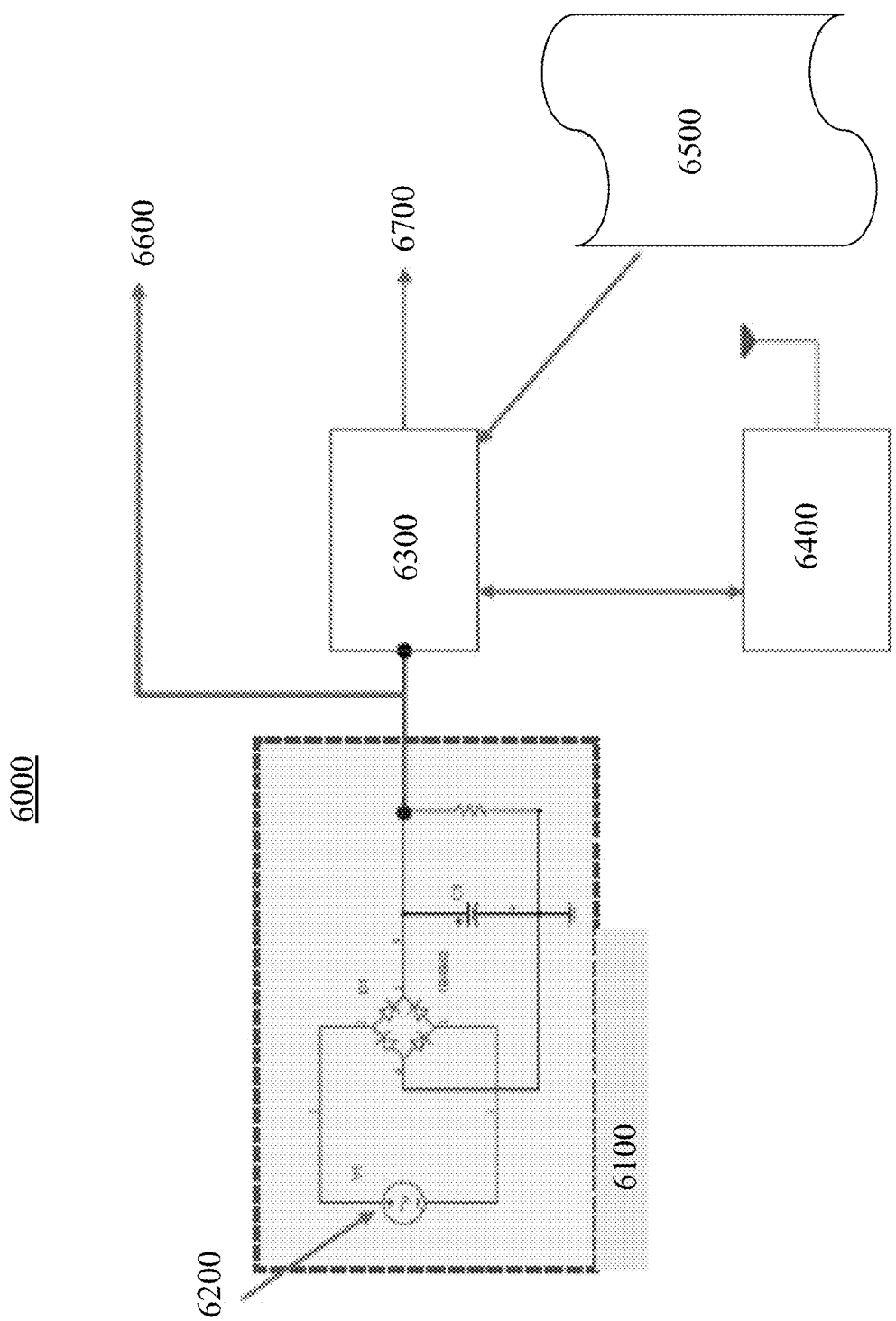
FIG. 6 is a block diagram of an exemplary embodiment of a wall mount multi point power and charger system 6000.

FIG. 6 is a block diagram of an exemplary embodiment of a wall mount multi point power and charger system 6000, which comprises an AC to DC power converter 6100 and a system controller 6300. AC to DC power converter 6100 receives electrical energy 6200, such as from a power circuit from a household wall outlet. Outputs from AC to DC power converter 6100 comprise a power flow 6600 to an RF or laser processor and an input signal to system controller 6300. System controller 6300 operates via machine instructions 6500 (e.g., a program). System controller 6300 is communicatively coupled to a LAN 6400. System controller 6300 outputs a control signal 6700 to an RF/laser and/or BB processor.

In certain exemplary embodiments, substantially untethered devices (e.g., electronic devices) determine a need for charging and requests charging via an AdHoc Meshed Network. An information device coupled to the AdHoc Meshed Network determines locations of each of the substantially untethered devices.

The information device coupled to the AdHoc Meshed Network determines which device needs to be charging, where it is and which wall mounted multi point power and charger will be directed to perform the charging. The selected wall multi point power and charger generates a directed beam pointing toward a particular untethered unit and charging starts. Untethered unit locations are constantly being determined and/or updated by information device coupled to the AdHoc Meshed Network. Each untethered unit monitors its own charging state, its location and communicates that charging state to the information device.

Figure 7:
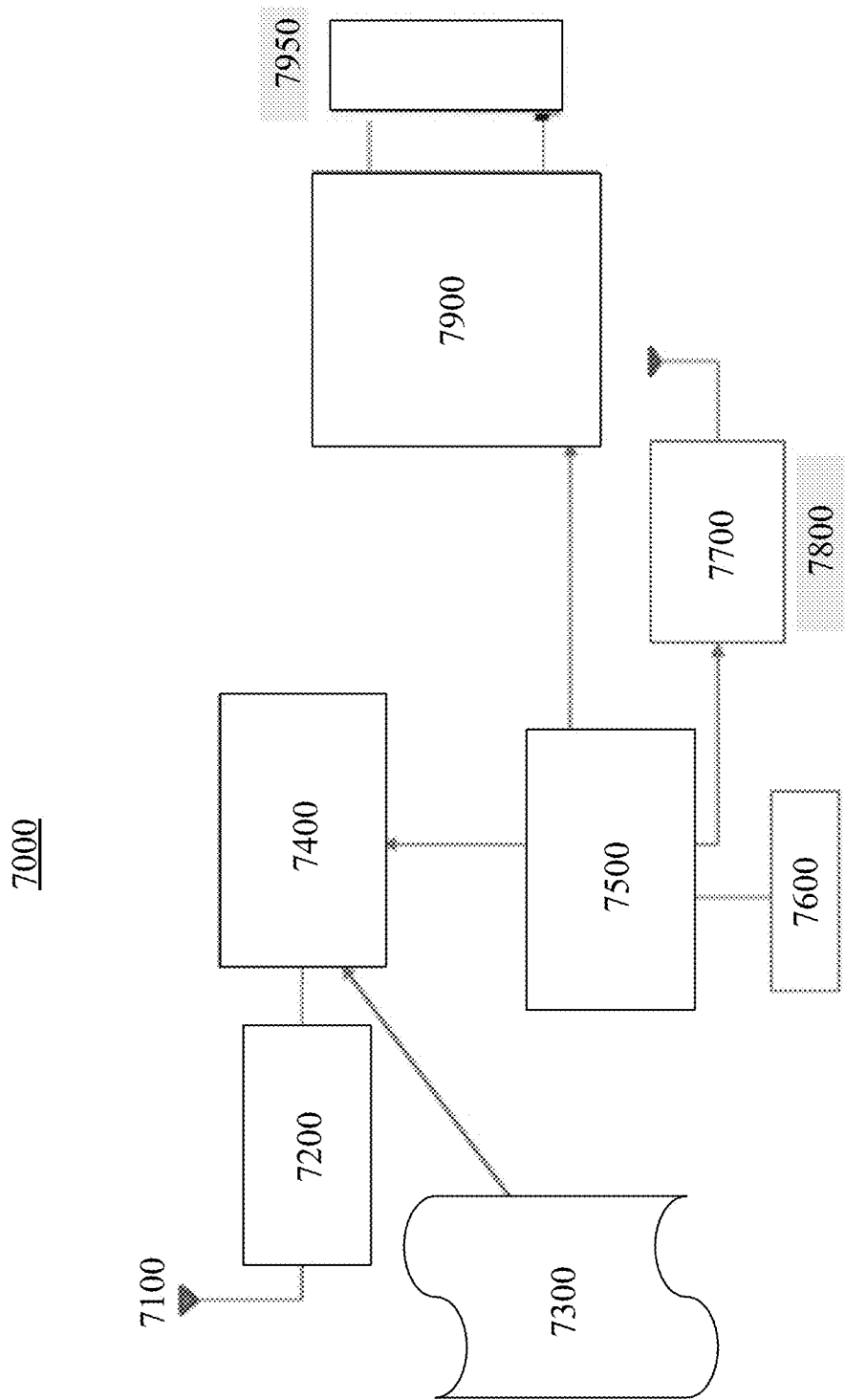
FIG. 7 is a block diagram of an exemplary embodiment of a system 7000.
Figure 8:
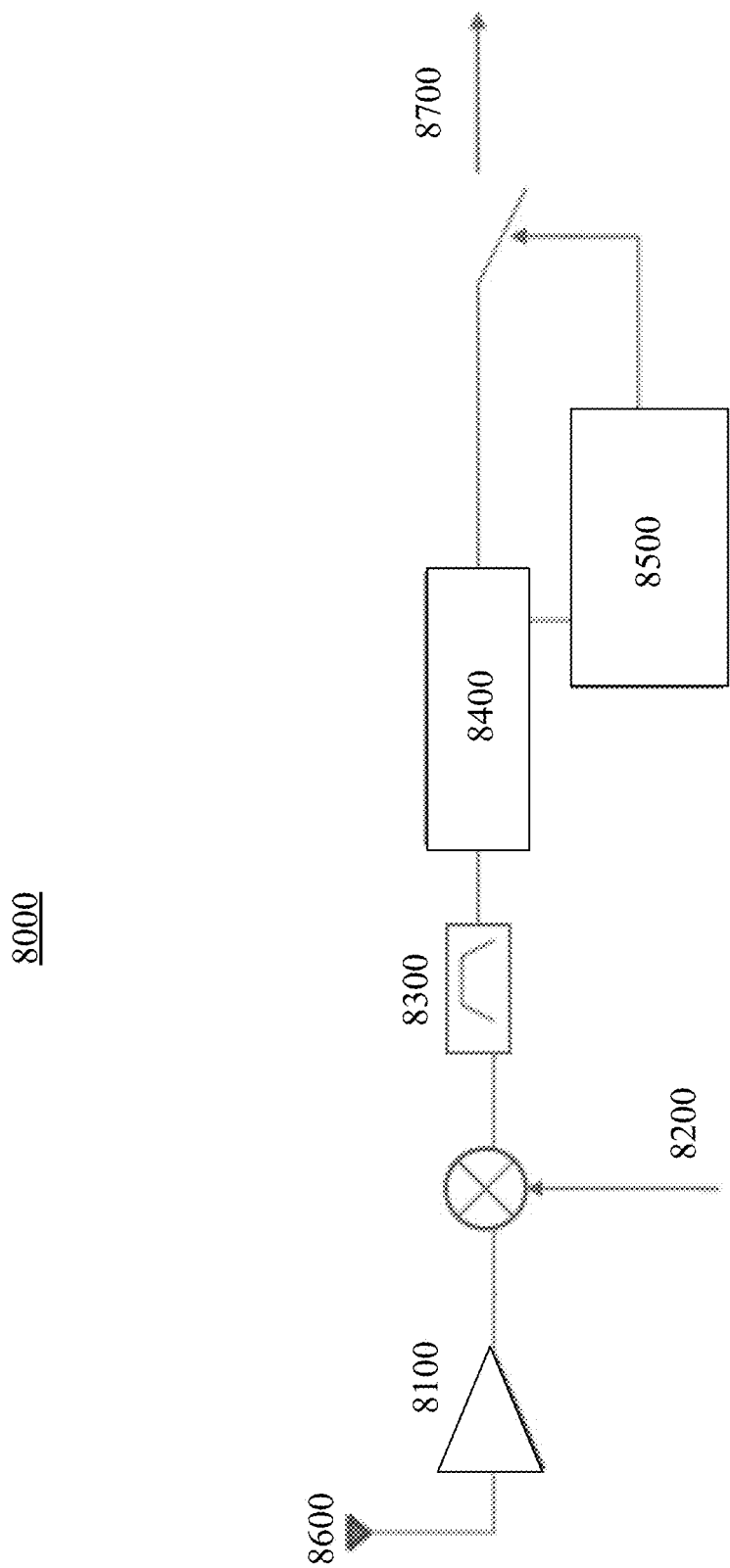
FIG. 8 is a block diagram of an exemplary embodiment of a mobile unit RF/BB processor system 8000.

FIG. 7 is a block diagram of an exemplary embodiment of a system 7000, which comprises an antenna 7100, an electromagnetic processor 7200, a baseband processor 7400, a controller 7500, an inertia measurement unit ("IMU") 7600, a baseband battery charging circuit 7900, and a battery 7950. Controller 7500 is communicatively coupled to a LAN 7700. LAN 7700 is communicatively coupled to a transmission channel 7800. Machine instructions 7300 are utilized by controller 7500 in processing signals that direct charging of battery 7950 via baseband battery charging circuit 7900. IMU 7600 assists in determining locations of devices communicatively coupled to controller 7500. Certain exemplary embodiments can be implemented as an Appliqué or as an integral part of the device that needs to be charged FIG. 8 is a block diagram of an exemplary embodiment of a mobile unit electromagnetic/baseband ("BB") processor system 8000, which comprises a low noise amplifier 8100, a local oscillator 8200, a band pass filter 8300, a demodulator 8400, and a processor 8500. Processor 8500 performs an electromagnetic destination calculation and causes an electromagnetic signal 8700 to a battery charger. An omnidirectional antenna 8600 receives electromagnetic energy, demodulates and determines the destination of a directional beam. If the directional beam is assigned to charge an electronic device, the DC electrical energy is available to charge a battery of the electronic device.

Figure 9:
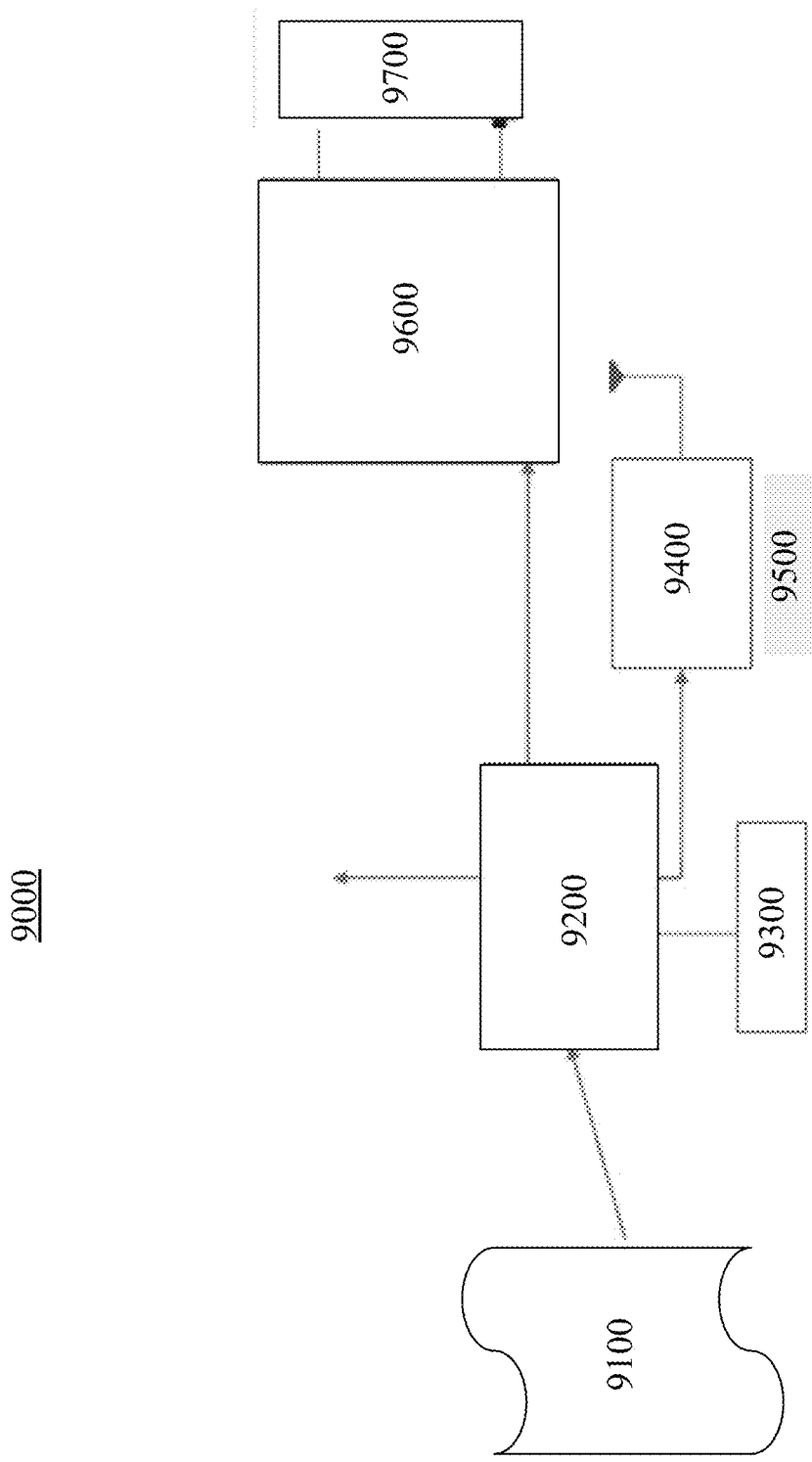
FIG. 9 is a block diagram of an exemplary embodiment of a system 9000.

FIG. 9 is a block diagram of an exemplary embodiment of a system 9000, which comprises a controller 9200, an IMU 9300, a baseband battery charging circuit 9600, and a battery 9700. Controller 9200 is communicatively coupled to a LAN 9400. LAN 9400 is communicatively coupled to a transmission channel 9500. Machine instructions 9100 are used by controller 9200 to facilitate charging of battery 9700.

Via Machine instructions 9100, controller 9200 determines if an electronic device comprising battery 9700 needs charging and issues a request via LAN 9400. LAN 9400 can be an AdHoc network. IMU 9300 provides a coarse (i.e., loosely approximated) location information that is transmitted collaboratively via the AdHoc Meshed Network to determine a fine (i.e., more accurately approximated) location. In some embodiments, LAN 9400 can be coupled to an AdHoc Meshed Network. When a beam is assigned to battery 9700, the charging of battery 9700 starts.

Figure 10:
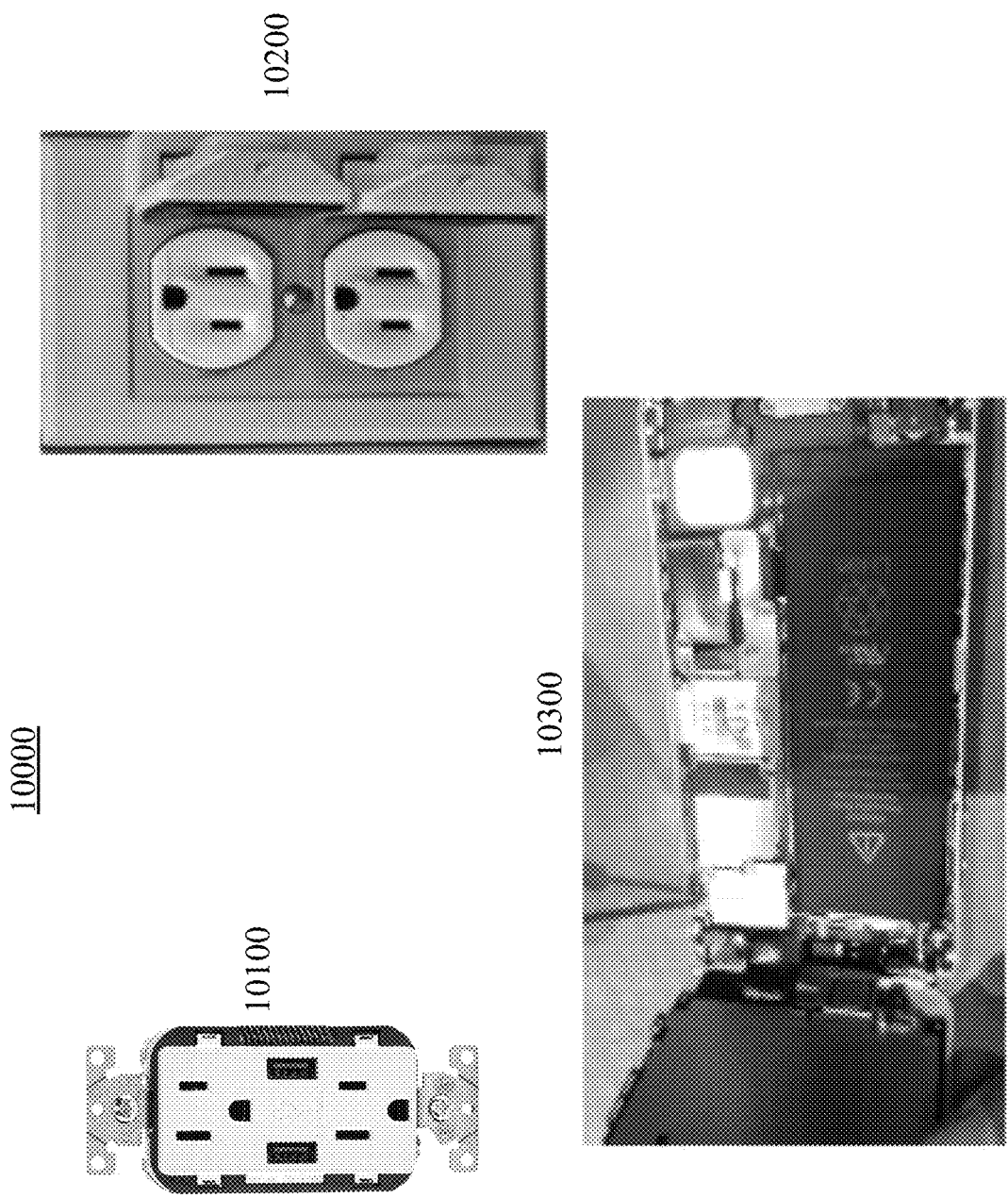
FIG. 10 comprises images 10000 of exemplary embodiments.

FIG. 10 comprises images 10000 of exemplary embodiments, which comprise an electrical receptacle 10100. A multi point power and charger 10300 can be of a form to be directly coupled to electrical receptacle 10100. When so coupled, multi point power and charger 10300 can cause electrical receptacle 10100 to have an appearance of installed multi point power and charger 10200.

Figure 11:
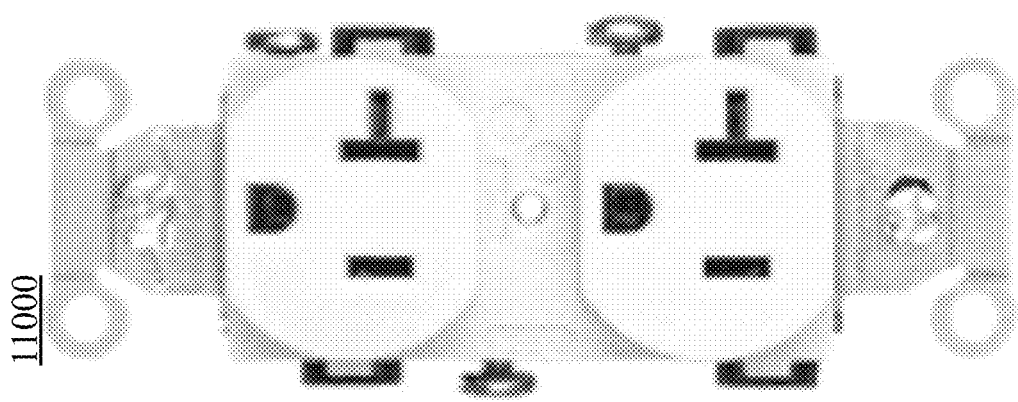
FIG. 11 is an image of a device 11000 of an exemplary embodiment.

FIG. 11 is an image of a device 11000 of an exemplary embodiment.

Device 11000 comprises pluggable electrical energy receptacles.

Certain exemplary embodiments are constructed to transmit wireless electrical power across the electromagnetic spectrum. The wireless electrical power is directed toward a rechargeable electronic device.

The device comprises a transmitter and antennae used to send wireless electrical power as part of a wireless electrical power network of devices. The device is constructed to become a part of a network; e.g., a local and/or wide area network ("LAN/WAN") of electric devices coupled to an electromagnetic grid.

The device is constructed to:
 communicate with other devices on the LAN/WAN;
 wirelessly communicate with receivers inside the LAN/WAN;
 send electromagnetic signal in one or a plurality of directions;

create and steer an electromagnetic beam as required;
wirelessly identify new devices on or not on the LAN/WAN;
form or increase a wireless Ad Hoc WiGL/LAN/WAN network to grow the LAN/WAN;
machine instructions programmable via hardware or firmware;
determine a wireless health of a receiver and communicate with other transmitters coupled to the network to send the receiver wireless electric power; and/or
report the transmitters health to a mobile or desktop device.

Certain exemplary embodiment provide a system comprising:
a network (see, e.g., network 25400 of FIG. 25);
a device (see, e.g., device 11000 of FIG. 11, device 12000 of FIG. 12, device 13000 of FIG. 13, device 14000 of FIG. 14, device 15000 of FIG. 15, device 16000 of FIG. 16, device 17000 of FIG. 17, device 18000 of FIG. 18, device 19000 of FIG. 19, device 20000 of FIG. 20000, device 21000 of FIG. 21, device 22000 of FIG. 22) comprising a wireless transceiver, the device constructed to:
identify an electronic device (see, e.g., electronic device 1300 of FIG. 1) in proximity to the device;
automatically add the electronic device to the network;
automatically determine a charge level of the electronic device;
direct an electromagnetic beam to the electronic device based upon a location of the electronic device;
recharge the electronic device via the wireless transceiver;
communicate with the electronic device via the network, wherein machine instructions to recharge the electronic device are communicated to the device via the network;
redirect the electromagnetic beam based upon a change of location of the electronic device; and
cause a charge level of the electronic device to be rendered on a user interface via a network signal.
based upon an automatic determination of a location of the electronic device, the device automatically removes the electronic device from the network.
identify the electronic device via a signal transmitted via the network.

Figure 12:
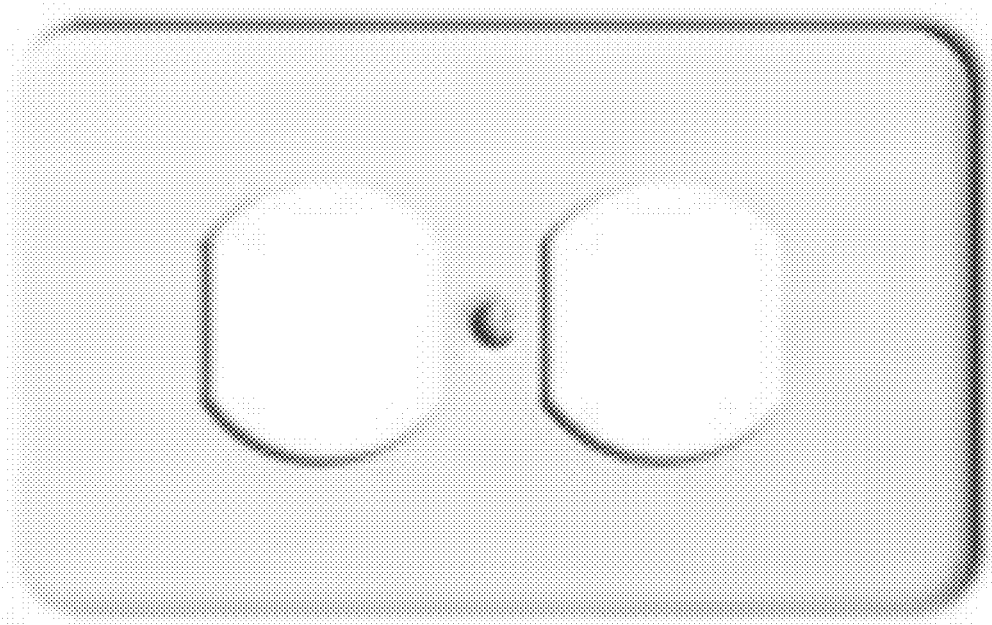
FIG. 12 is an image of a device 12000 of an exemplary embodiment.

FIG. 12 is an image of a device 12000 of an exemplary embodiment. Device 12000 covers surfaces of an electrical component, the electrical component comprising pluggable electrical energy receptacles.

Figure 13:
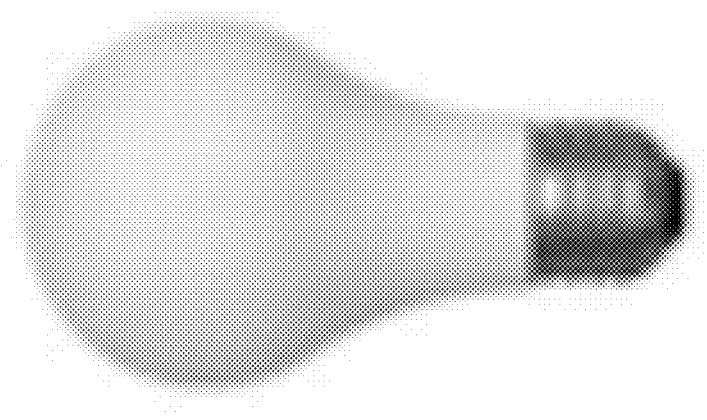
FIG. 13 is an image of a device 13000 of an exemplary embodiment.

FIG. 13 is an image of a device 13000 of an exemplary embodiment. Device 13000 comprises an incandescent lamp.

Figure 14:
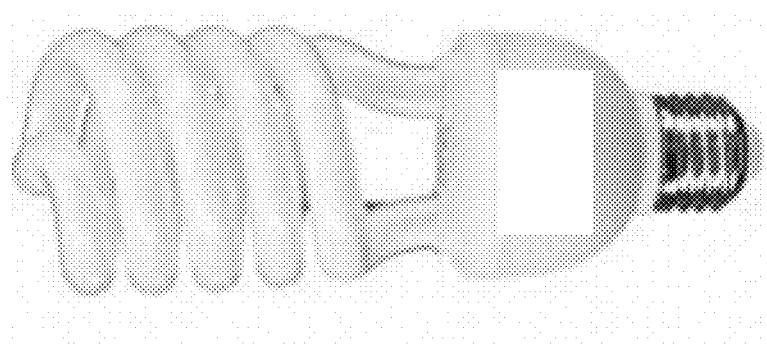
FIG. 14 is an image of a device 14000 of an exemplary embodiment.

FIG. 14 is an image of a device 14000 of an exemplary embodiment. Device 14000 comprises a twisted fluorescent lamp.

Figure 15:
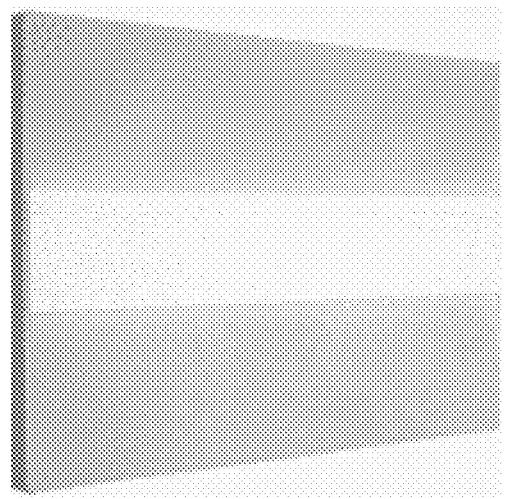
FIG. 15 is an image of a device 15000 of an exemplary embodiment.

FIG. 15 is an image of a device 15000 of an exemplary embodiment. Device 15000 comprises a halogen lamp.

Figure 16:
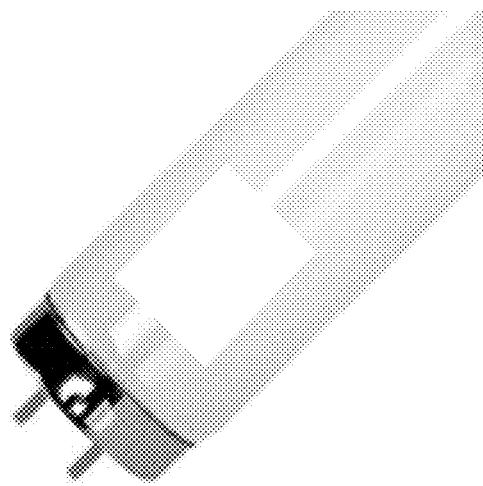
FIG. 16 is an image of a device 16000 of an exemplary embodiment.

FIG. 16 is an image of a device 16000 of an exemplary embodiment. Device 16000 comprises a tube fluorescent lamp.

Figure 17:
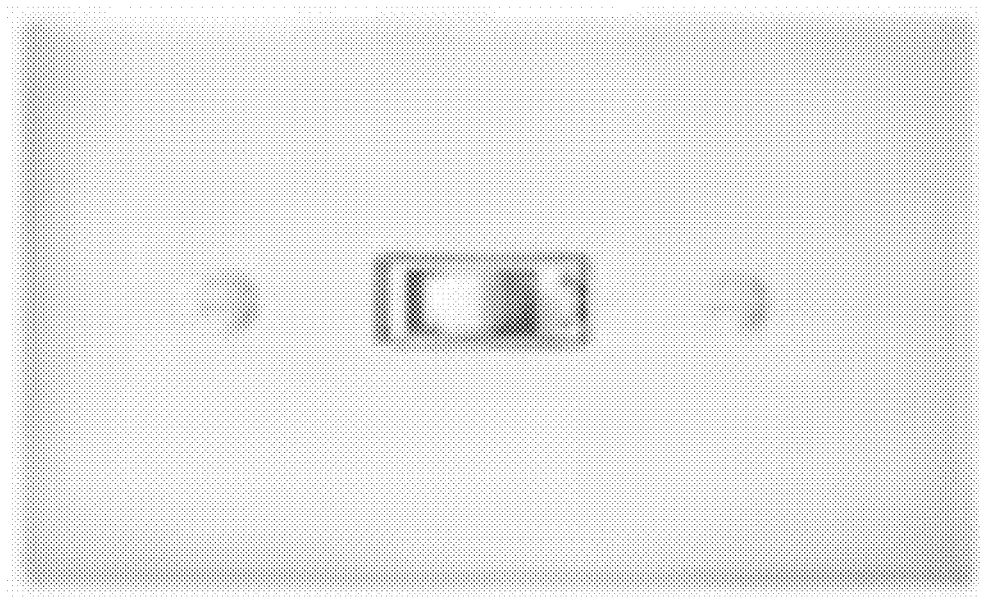
FIG. 17 is an image of a device 17000 of an exemplary embodiment.

FIG. 17 is an image of a device 17000 of an exemplary embodiment. Device 17000 comprises a light switch.

Figure 18:
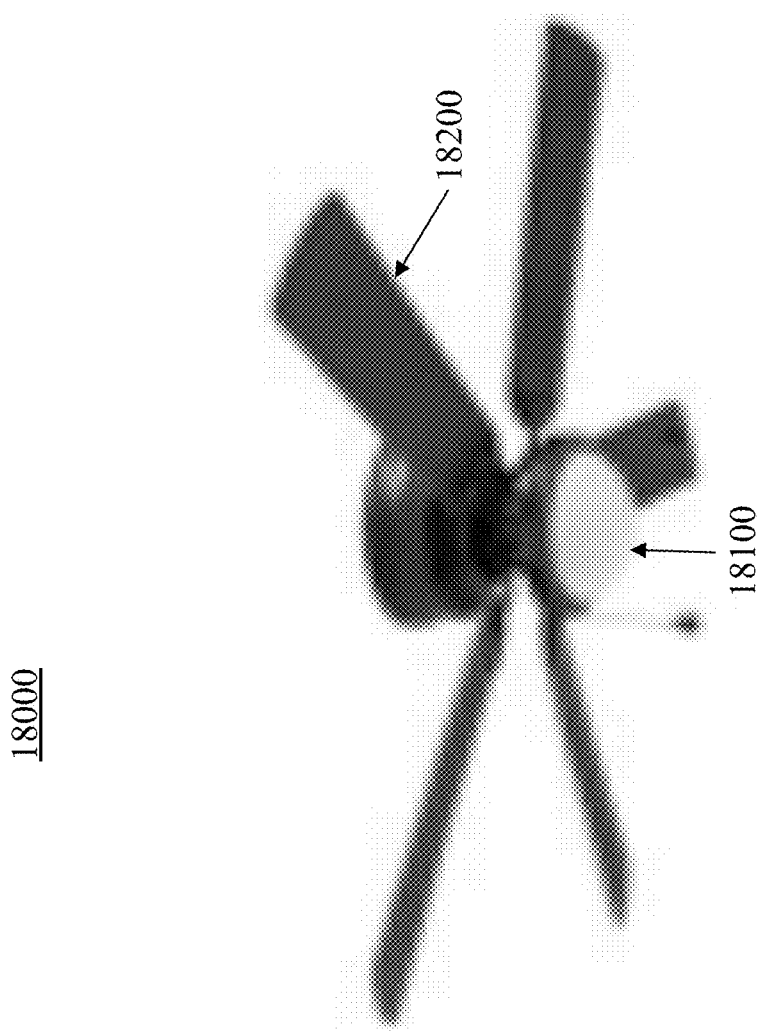
FIG. 18 is an image of a device 18000 of an exemplary embodiment.

FIG. 18 is an image of a device 18000 of an exemplary embodiment. Device 18000 comprises a lamp 18100 and a fan 18200.

Figure 19:
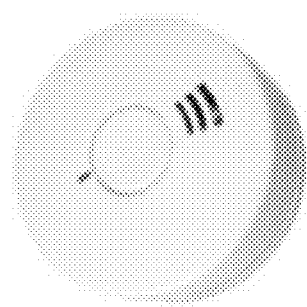
FIG. 19 is an image of a device 19000 of an exemplary embodiment.

FIG. 19 is an image of a device 19000 of an exemplary embodiment. Device 19000 comprises a smoke detector.

Figure 20:
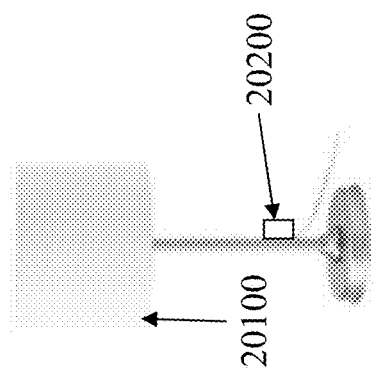
FIG. 20 is an image of a device 20000 of an exemplary embodiment.

FIG. 20 is an image of a device 20000 of an exemplary embodiment. Device 20000 comprises a lamp 20100. Lamp 20100 comprises a switch 20200.

Figure 21:
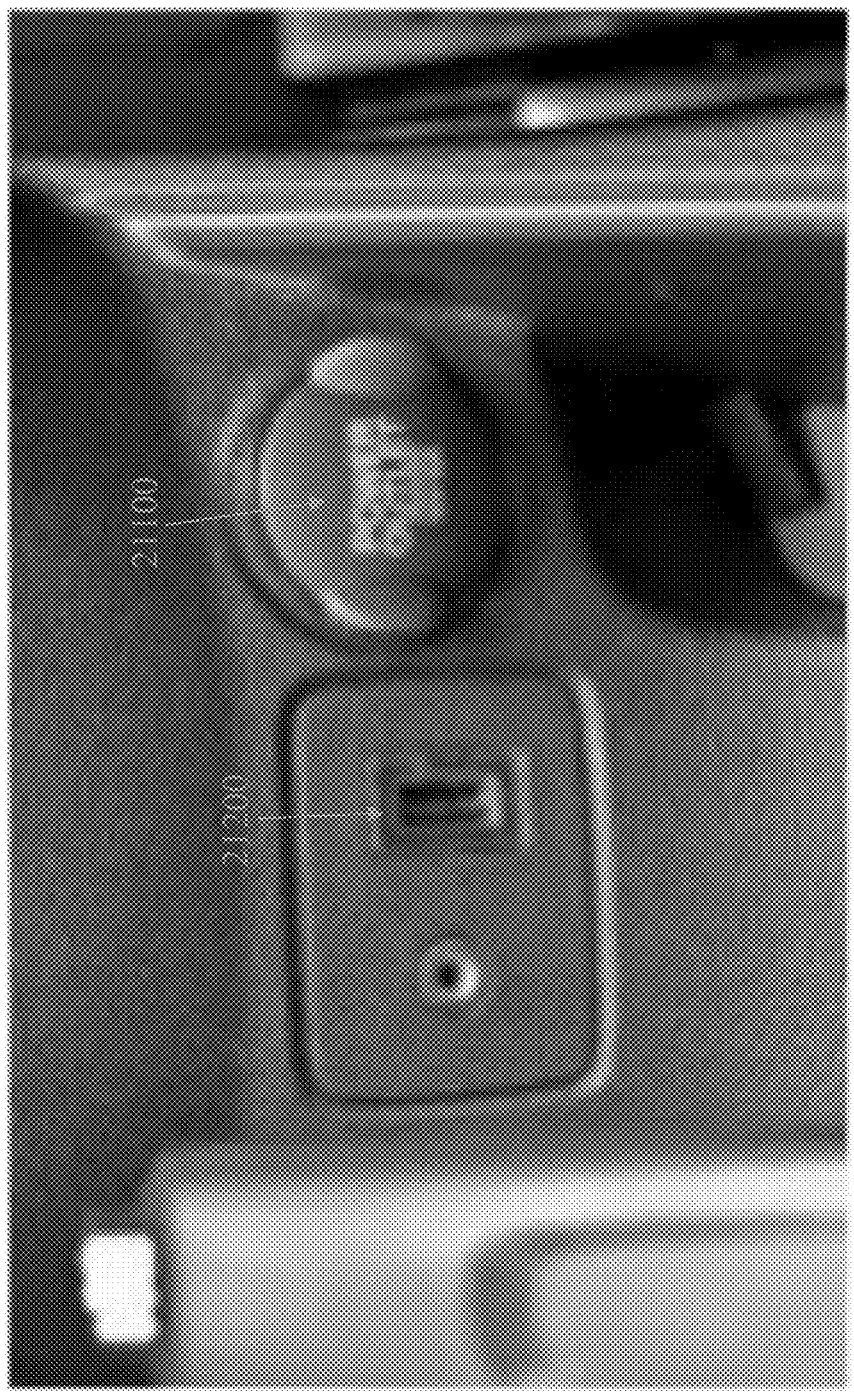
FIG. 21 is an image of a device 21000 of an exemplary embodiment.

FIG. 21 is an image of a device 21000 of an exemplary embodiment. Device 21000 comprises a direct current power receptacle 21100 and a Universal Serial Bus port 21200.

Figure 22:
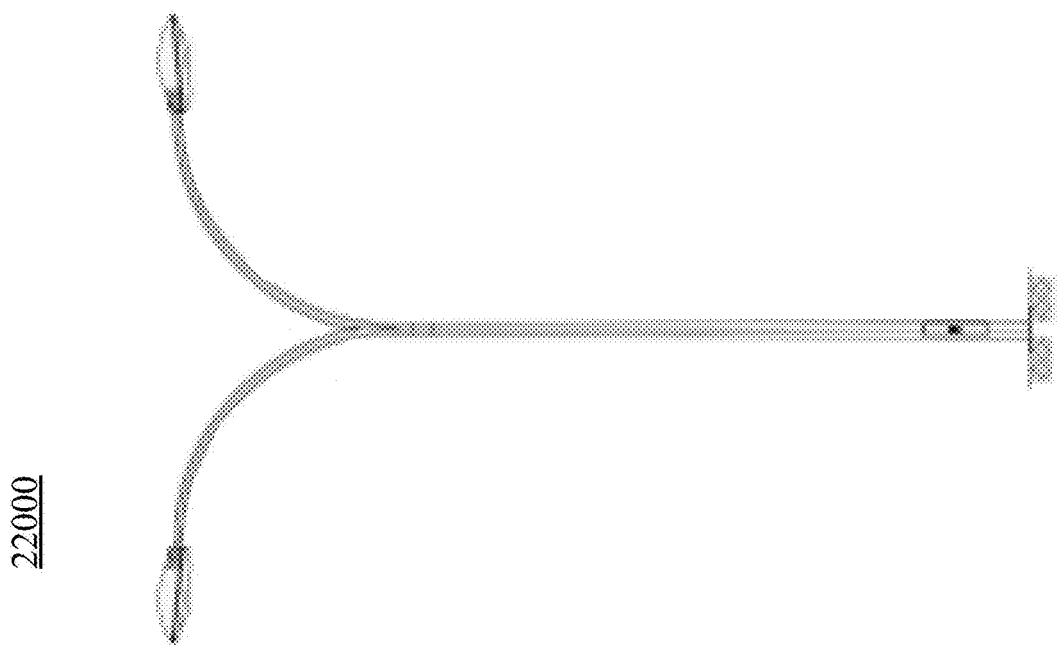
FIG. 22 is an image of a device 22000 of an exemplary embodiment.

FIG. 22 is an image of a device 22000 of an exemplary embodiment. Device 22000 comprises a street light.

Figure 23:
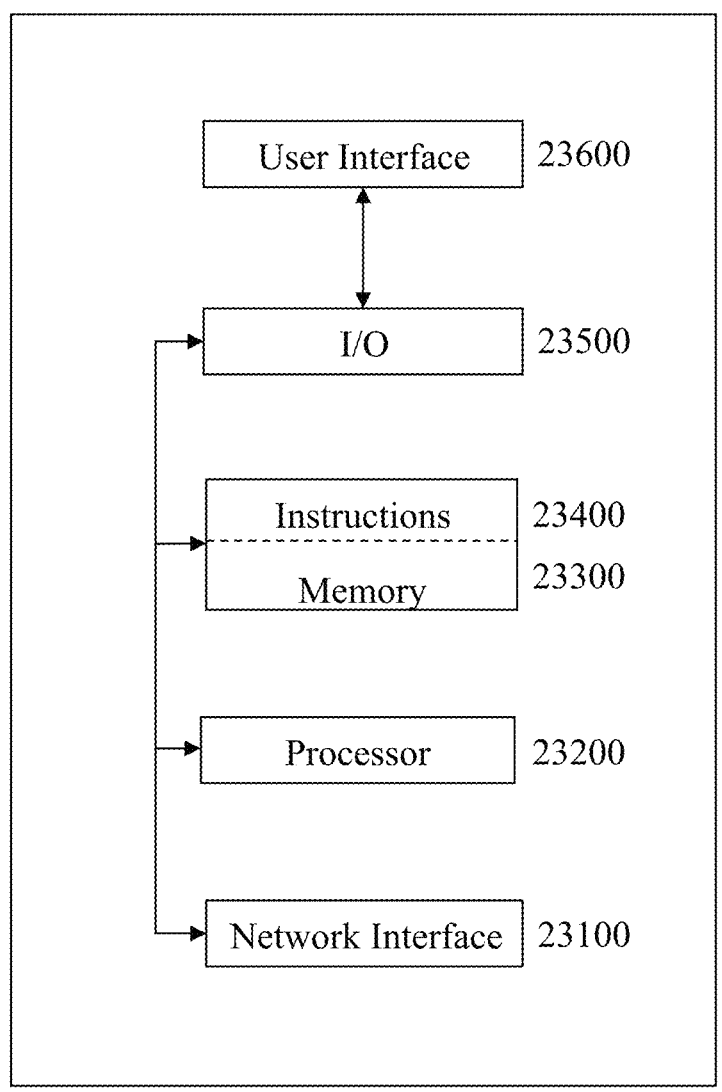
FIG. 23 is a block diagram of an exemplary embodiment of an information device 23000.

FIG. 23 is a block diagram of an exemplary embodiment of an information device 23000, which in certain operative embodiments can comprise, for example, the controller shown on page 6 of FIG. 1. Information device 23000 can comprise any of numerous circuits and/or components, such as for example, one or more network interfaces 23100, one or more processors 23200, one or more memories 23300 containing instructions 23400, one or more input/output (I/O) devices 23500, and/or one or more user interfaces 23600 coupled to one or more I/O devices 23500, etc.

In certain exemplary embodiments, via one or more user interfaces 23600, such as a graphical user interface, a user can view a rendering of information related to charging and/or energizing devices via a charge controller. The user can also disable the charging and/or set the charging at certain times or power levels.

Figure 24:
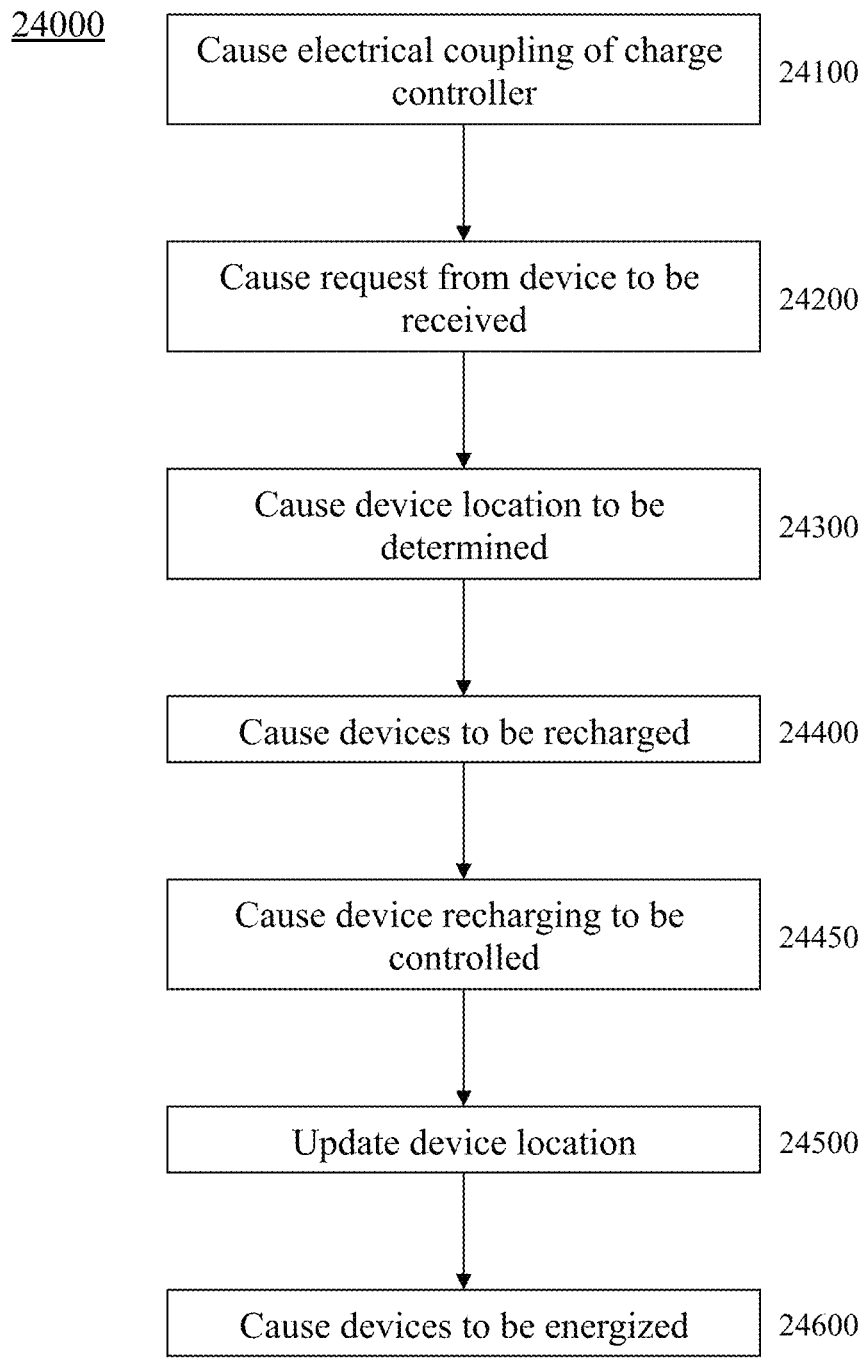
FIG. 24 is a flowchart of an exemplary embodiment of a method 24000.

FIG. 24 is a flowchart of an exemplary embodiment of a method 24000. At activity 24100, certain exemplary embodiments can cause a coupling of a charge controller to an electrical energy source (e.g., an electrical outlet, etc.). At activity 24200, certain exemplary embodiments can cause a request from a device to be received (e.g., a request to recharge a partially or nearly fully depleted battery). At activity 24300, certain exemplary embodiments can cause an electronic device to be located.

At activity 24400, certain exemplary embodiments can cause the electronic device to be charged via the charge controller. Certain exemplary embodiments comprise causing an electronic device and/or device's receiver to charge or be powered via a multi point power and charger of a plurality of multi point power and chargers. Certain exemplary embodiments comprise receiving a request to charge or power the electronic device. The multi point power and charger is coupleable to the electrical energy source. The multi point power and charger is constructed to direct a beam of electrical energy toward the electronic device. The multi point power and charger can be selected from the plurality of multi point power and chargers responsive to a first determination of a location of the electronic device and a second determination that a charging or power request has been received the electronic device. The beam of electrical energy is directed responsive to the determination of the location of the electronic device. The electronic device can be coupled to a WiGL local area network and the multi point power and charger can also be coupled to the local area network. The local area network can comprise and/or be coupled to the electrical energy source. Electromagnetic charging or power can be dynamically controlled to provide low radiant power losses in the vicinity of devices to be charged. A charging/power element can selected based on an optimum power delivered to the electronic device to based at least one of:
a requested speed of charging or power; and/or
a level of charge of a battery or internal power comprised by the electronic device.

At activity 24450, certain exemplary embodiments cause device recharging to be controlled via the charge controller. At activity 24500, certain exemplary embodiments automatically update the location of the electronic device. At activity 24600, certain exemplary embodiments cause electrical devices to be energized via the charge controller.

Certain exemplary embodiments cause an electronic device to charge or power via a device, the device comprising a wireless transceiver, the device constructed to:
- identify an electronic device in proximity to the device;
- automatically add the electronic device to the network;
- automatically determine a charge or power level of the electronic device;
- direct an electromagnetic beam to the electronic device based upon a location of the electronic device;
- recharge or power the electronic device via the wireless transceiver;
- communicate with the electronic device via the network, wherein instructions to recharge the electronic device are communicated to the device via the network;
- redirect the electromagnetic beam based upon a change of location of the electronic device; and
- cause a charge or power level of the electronic device to be rendered on an information device via a network signal.

Figure 25:
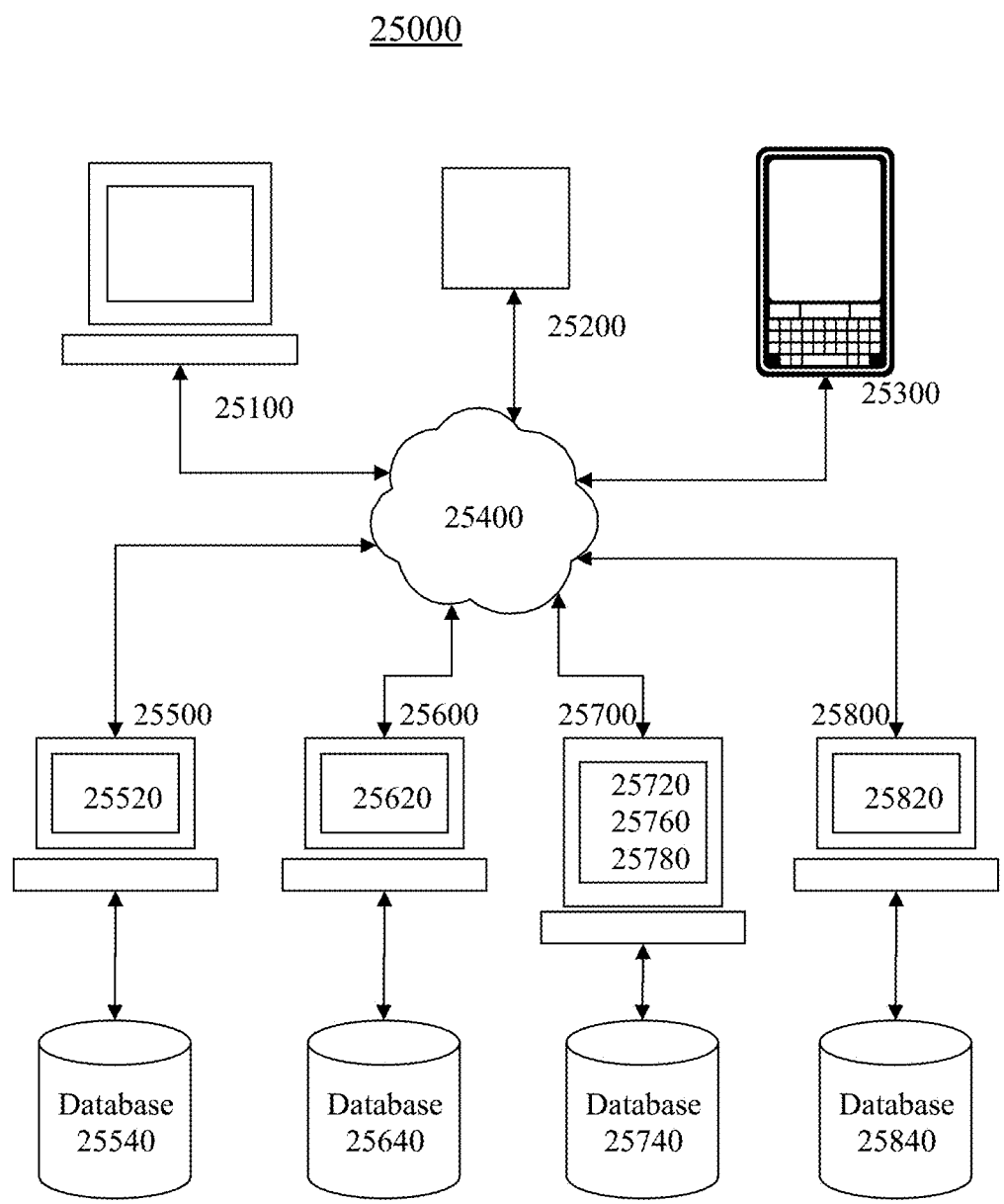
FIG. 25 is a block diagram of an exemplary embodiment of a system 25000.

FIG. 25 is a block diagram of an exemplary embodiment of a system 25000, which can comprise a smartphone 25300, an information device 25100, tablet 25200, a network 25400, a first server 25500, a second server 25600, a third server 25700, and a fourth server 25800. First server 25500 can comprise a first user interface 25520 and can be coupled to a first database 25540. Second server 25600 can comprise a second user interface 25620 and can be coupled to a second database 25640. Third server 25700 can comprise a third user interface 25720, a processor 25760, machine instructions 25780, and can be coupled to a third database 25740. Fourth server 25800 can comprise a fourth user interface 25820 and can be coupled to a fourth database 25840. Any of the methods and/or steps thereof can be carried out in whole or in part by tablet 25200, smartphone 25300, information device 25100 and/or first server 25500. Second server 25600, third server 25700, and/or fourth server 25800 can each be associated with implementation of a system via which rides are provided to customers. In certain exemplary embodiments, system 25000 can be used to implement one or more methods disclosed herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
add—to cause entry into a communicatively coupled state.
AdHoc Meshed Network—a network that forms substantially without prior preparation and conducts wireless energy receiver management and handoffs from Transmitter to Transmitter.
alternating current—an electric current that periodically reverses direction.
and/or—either in conjunction with or in alternative to.
apparatus—an appliance or device for a particular purpose
associate—to join, connect together, and/or relate.
automatically—acting or operating in a manner essentially independent of external influence or control. For example, an automatic light switch can turn on upon "seeing" a person in its view, without the person manually operating the light switch.
base band processor—a portion of a multi point power and charger that receives electrical energy via a direct current and outputs a plurality of direct current energy streams to a radio frequency processor.
beam—a ray of electromagnetic energy.
can—is capable of, in at least some embodiments.
cause—to produce an effect.
change—to make different.
charge—to cause to store electrical energy such as in a battery.
charging beam—a ray of energy transmitted substantially along a line extending from a multi point power and charger toward a determined location of an electronic device, which ray of energy has capacity to charge a battery of the electronic device.
circuit—an electrically conductive pathway and/or a communications connection established across two or more switching devices comprised by a network and between corresponding end systems connected to, but not comprised by the network.
communicate—to exchange information.
comprising—including but not limited to.
configure—to make suitable or fit for a specific use or situation.
constructed to—made to and/or designed to.
control—to direct one or more activities.
convert—to transform, adapt, and/or change.
converter—a portion of a multi point power and charger that receives alternating current electrical energy and outputs direct current electrical energy.
couple—to join, connect, and/or link together.
cover—to place over a surface of something.
create—to bring into being.
data—distinct pieces of information, usually formatted in a special or predetermined way and/or organized to express concepts.
define—to establish the outline, form, or structure of
detect—to discover an existence or presence of something.
detector—a system constructed to discover an existence or presence of something.
determine—to obtain, calculate, decide, deduce, and/or ascertain.
device—a machine, manufacture, and/or collection thereof.
direct—to send substantially along a line to a determined location of an electronic device.
directable—capable of being sent substantially along a line to a determined location of an electronic device.
direct current—an electric current that flows substantially in a single direction.
direction—substantially along a line from a multi point power and charger toward a determined location of an electronic device.
directional beam—a ray of energy transmitted substantially along a line extending from a multi point power and charger toward a determined location of an electronic device.

dynamically—done in real time and without prior planning.
electrical energy—power absorbed or delivered via an electrical circuit.
electrical energy source—a power supply from a power generator.
electromagnetic—a field from a type of physical interaction that occurs between electrically charged particles.
electronic—a system constructed to process electrical signals.
electronic device—a device comprising circuitry with active semiconductors and/or passive elements. Electronic devices comprise televisions, DVD players, laptops, desktop computers, mobile phones, iPods, iPads, cameras, fans, ovens, washing machines, game consoles, printers and/or radios, etc.
electronic home appliance—a device constructed for a particular household use or function (e.g., refrigerator, toaster, and/or stove, etc.).
emit—to send forth.
electronic office appliance—a device constructed for a particular business use or function (e.g., printer, computer, cash register, and/or WiFi router, etc.)
estimate—to calculate and/or determine approximately and/or tentatively.
fan—a machine adapted to move air, typically via rotating vanes.
fluorescent lamp—a low-pressure mercury-vapor gas-discharge lamp that uses fluorescence to produce visible light.
follow—to track something that is in motion.
generate—to create, produce, give rise to, and/or bring into existence.
general location—an approximate estimate of a place occupied by something.
halogen lamp—an incandescent lamp comprising a tungsten filament sealed into a compact transparent envelope that is filled with a mixture of an inert gas and a small amount of a halogen such as iodine or bromine.
handoff—to switch from a first device to a second device.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
identify—to recognize a particular thing.
illumination—an act of emitting light energy.
incandescent lamp—a lamp that emits light due to the glowing of a heated material.
indicate—to be a sign of.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
initialize—to prepare something for use and/or some future event.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
install—to connect or set in position and prepare for use.
internal—comprised by a single building or network.
light—a system comprising a light.
level—a relative position on a scale.
lighter—a device constructed to provide a flame.
light—something that emits electromagnetic radiation within a portion of the electromagnetic spectrum that is visible to a human eye.
location—a place occupied by something.
loss—electrical energy that is environmentally dissipated.
machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.
machine readable medium—a physical structure from which a machine can obtain data and/or information. Examples include a memory, punch cards, etc.
may—is allowed and/or permitted to, in at least some embodiments.
memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimize—reduce to a greatest extent possible.

motion—to relocate from a first location to a second location multi directional antenna array—a plurality of transducers arranged in a regular pattern that are constructed to directionally emit radio frequency spectrum electrical energy substantially wirelessly.

multi point power and charger—a system that is constructed to provide substantially wireless electrical recharging energy to electronic devices.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

optimum power—electrical energy in a quantity that provides approximately a best result for charging an electronic device.

packet—a discrete instance of communication.

plug—to fill one or more receptacles.

plurality—the state of being plural and/or more than one.

power—to supply electrical energy in a sufficient quantity to operate something.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

proximity—close to something.

radio frequency—is any of the electromagnetic wave frequencies that lie in the range extending from approximately 3 kHz to approximately 300 GHz, which include those frequencies used for communications or radar signals.

radio frequency processor—a portion of a multi point power and charger that receives a plurality of direct current energy streams from a base band processor and outputs phase shifted direct current energy streams to an antenna array.

radiant power—electrical energy that is distributed via air.

range—an extent to which a directional beam can travel and still be capable of charging or powering an electronic device.

real time—relating to systems that provide an absolute deterministic response to an event. Such a response is not based on average event time. Instead, in such systems, the deadlines are fixed and the system must guarantee a response within a fixed and well-defined time. Systems operating in real-time typically interact at a low level with physical hardware via embedded systems, and can suffer a critical failure if time constraints are violated. A classic example of a real-time system is the anti-lock brakes on a car. The real-time constraint, or deadline, in this system is the time in which the brakes must be released to prevent the wheel from locking. Another example is a car engine control system, in which a delayed control signal might cause engine failure or damage. Other examples of real-time systems include medical systems such as heart pacemakers and industrial process controllers.

receive—to get as a signal, take, acquire, and/or obtain.

receiver—a device constructed to access and accept signals from signal sources.

receptacle—a port defined by an object, which port is constructed to receive one or more electrically conductive prongs for electrical energy conduction.

recharge—to restore an electrical potential to something via providing electrical energy.

recommend—to suggest, praise, commend, and/or endorse.

redirect—to change a direction of something.

reduce—diminish in magnitude.

remotely—from a distinctly different location.

remove—to take something from a communicatively coupled state.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

responsive—reacting to an influence and/or impetus.

select—to make a choice or selection from alternatives.

self-charge—to restore an electrical potential to something substantially without coupling to via one or more wires to electrical energy.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

smoke—a gaseous product from burning a plant material.

street light—a raised source of light on the edge of a road or path.

store—to place, hold, and/or retain data, typically in a memory.

substantially—to a great extent or degree.

surface—the outer boundary of an object or a material layer.

switch—a mechanical, electrical, and/or electronic device that opens and/or closes circuits, completes and/or breaks an electrical path, and/or selects paths and/or circuits.

system—a collection of mechanisms, devices, machines, articles of manufacture, processes, data, and/or instructions, the collection designed to perform one or more specific functions.

system controller—an information device that regulates electrical energy flow magnitudes and directions in a multi point power and charger.

transmission—the broadcasting of electromagnetic waves from one location to another, as from a transmitter.

transmit—to send as a signal, provide, furnish, and/or supply.

tubular—having a general form of an elongated cylinder.

twisted—having a spiraled appearance.

update—to change based upon new or more accurate information.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vicinity—in a region in proximity to something.

via—by way of and/or utilizing.

update—to incorporate new or more accurate information in a database, program, and/or procedure.

weight—a value indicative of importance.

Wi-Fi—pertaining to a network that utilizes one of a family of wireless network protocols, based on the IEEE 802.11 family of standards, which can be used for local area networking of devices and Internet access.

wireless—a transfer of information or power between two or more points that are not connected by an electrical conductor.

wireless transceiver—a device constructed to transfer signals between sources and destinations without the use of wires.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A wireless multi point power charger system comprising:

at least one multipoint power charger that is coupled to an electric power source, each multipoint power charger comprising a system controller coupled to an information device, a multidirectional antenna array; and at least one wireless electrical energy receiver coupled to a corresponding electronic device configured to receive wireless electrical energy from the multipoint power charger system; wherein the wireless electrical energy receiver is connected to the system controller and to at least one other wireless electrical energy receiver via a meshed ad-hoc network comprising a cellular network and the internet provided by the electronic device, and the wireless electrical energy receiver is not directly connected to the system controller via a local area network;

the multipoint power charger configured to convert electrical energy from the electric power source into wireless electrical energy, and emit the wireless electrical energy as a plurality of directional electromagnetic energy beams via the multidirectional antenna array, at least one of the plurality of directional electromagnetic energy beams directed to a location of the wireless electrical energy receiver and controlled by the system controller;

wherein the information device is configured to determine the location of each wireless electrical energy receiver at least in-part by location information provided by each of the plurality of wireless electrical energy receivers present, via the meshed ad-hoc network, the wireless multi point power charger system further comprising one or more external remote systems comprising one or more computing devices comprising one or more data servers coupled to at least one database comprising electronic device information, which is in electronic communication with the system controller via a wide area network comprising the internet; and wherein the system controller provides instructions comprising data provided by the one or more external remote systems, to the wireless electrical energy receiver via the meshed ad-hoc network to allow the wireless electrical energy receiver to receive the directional electromagnetic energy beams and charge the battery of the electronic device.

2. The system of claim 1, wherein the one or more computing devices of the external remote systems comprises one or more data servers coupled to at least one database comprising user information.

\* \* \* \* \*